O. A. MENTZER.
NUT AND BOLT LOCKING AND RELEASING DEVICE.
APPLICATION FILED NOV. 9, 1914.
1,143,127.
Patented June 15, 1915.
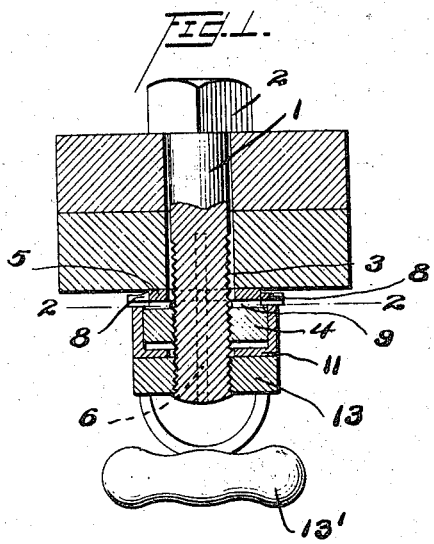
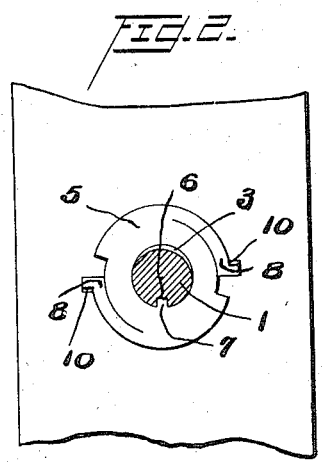
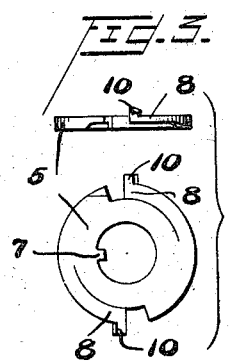
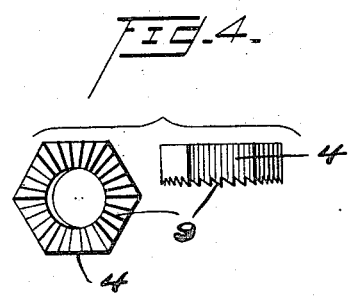
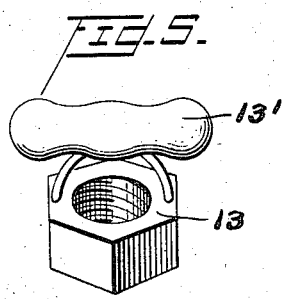
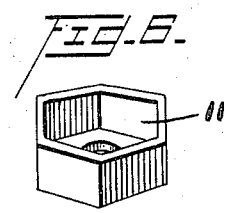
Inventor
Oliver A. Mentzer
Witnesses
By
Attorney

UNITED STATES PATENT OFFICE.

OLIVER A. MENTZER, OF LANCASTER, PENNSYLVANIA, ASSIGNOR OF ONE-FOURTH TO HENRY E. RANSING AND ONE-FOURTH TO CHARLES L. MARSHALL, BOTH OF LANCASTER, PENNSYLVANIA, AND ONE-FOURTH TO FREDERIC C. SWEETON, OF HADDONFIELD, NEW JERSEY.

NUT AND BOLT LOCKING AND RELEASING DEVICE.

1,143,127.

Specification of Letters Patent. Patented June 15, 1915.

Application filed November 9, 1914. Serial No. 871,019.

*To all whom it may concern:*

Be it known that I, OLIVER A. MENTZER, a citizen of the United States, residing at Lancaster, in the county of Lancaster and State of Pennsylvania, have invented certain new and useful Improvements in Nut and Bolt Locking and Releasing Devices, of which the following is a specification.

My invention relates to nut and bolt locking and releasing devices.

The object of my invention is to produce a device for releasing the engaging parts of a ratchet-faced nut and pawl washer non-rotatably carried on a bolt to permit their disengagement and separation, and a further object of my invention is to produce a more simple, cheap and efficient device of said character than has heretofore been attained.

To these ends, my invention includes the combination and arrangement of component parts to be hereinafter described and more particularly pointed out in the claim.

In the accompanying drawings, in which like reference characters indicate similar parts, Figure 1 is a longitudinal sectional view of my invention; Fig. 2 is a transverse sectional view taken on the line 2—2 of Fig. 1; Fig. 3 is a detail view of my pawl washer; Fig. 4 is a similar view of my ratchet-faced nut, and Figs. 5 and 6 are respectively views of the nut and cap for releasing the engagement between the ratchets and locking pawls.

Referring now to the drawings, 1 designates a bolt having an angular head 2, the opposite end of which is screw threaded at 3, on which is carried the nut 4 hereinafter described.

A pawl washer 5, hereinafter described, is adapted to be non-rotatably carried on the bolt adjacent to the nut, and the bolt and washer are correspondingly formed to prevent rotation with respect of each other. In the preferred form of my device, I provide one or more longitudinal grooves 6 in the bolt in which the tongue 7 on the washer 5 projects.

As shown in the drawings, the washer 5 is provided with one or more spring pawls 8 adapted to engage the teeth 9 on the inner face of the nut 4 when screwed into contact therewith, and thus lock the nut in position and prevent its reverse movement until disengaged as hereinafter set forth. In the usual form of ratchet teeth employed, the sides or faces thereof meet at their apexes at an acute angle, and the pawl-engaging faces are substantially at right angles to the plane of the face of the nut. The pawls 8 are each provided with a radially projecting wing 10 adapted to be pressed by the cap or collar 11 hereinafter described.

It will be obvious from the foregoing description, that it will be impossible to unscrew the nut or bolt when secured as shown or to disengage or release the parts without first disengaging the pawls and ratchet teeth. For this purpose, I provide a cap or collar 11 which is slightly deeper than the thickness of the nut 4 and of corresponding shape, adapted to fit snugly over the nut. Said cap is provided with a central orifice through which the screw-threaded portion of the bolt projects. Said cap, when in position bears upon the projecting wings 10 of the pawls, and when forced downwardly by the nut 13 presses the pawls out of engagement with the teeth. As shown, the nut 13 is formed to correspond with the shape and size of the cap, whereby when the pawls and ratchet teeth have been thus disengaged, the ratchet nut, together with the cap and outer nut 13 may be readily unscrewed with an ordinary wrench by spanning the adjacent edges thereof. The outer nut 13 may be provided with a handle 13′ to facilitate its use.

Having thus described my invention, what I claim as new, and desire to be secured by Letters Patent, is—

In a nut locking and releasing device, the combination with a bolt, of a washer non-rotatably carried thereon, having a spring pawl or pawls thereon each of which is provided with a radial wing, a ratchet faced nut adapted to engage the pawl or pawls on the washer to prevent movement except in a locking direction, a cap or collar adapted to fit over said nut having a greater depth than the thickness of the nut and being non-rotatable thereon, said cap or collar being adapted to bear upon the radial wings of the washer pawls, and an outer nut corresponding in size and shape to said cap or collar adapted to press same inwardly to disengage the pawl or pawls from the ratchet teeth to permit the removal of the locked nut from the bolt, substantially as described.

OLIVER A. MENTZER.

Witnesses:
WILLIAM PRICE,
MARY C. STONER.